US008831009B2

(12) United States Patent
Brown

(10) Patent No.: US 8,831,009 B2
(45) Date of Patent: Sep. 9, 2014

(54) SYSTEM AND METHOD FOR SELFISH CHILD CLUSTERING

(75) Inventor: Jeremy R. Brown, Orem, UT (US)

(73) Assignee: Oracle International Corporation, Redwood City, CA (US)

( * ) Notice: Subject to any disclaimer, the term of this patent is extended or adjusted under 35 U.S.C. 154(b) by 1542 days.

(21) Appl. No.: 11/687,525

(22) Filed: Mar. 16, 2007

(65) Prior Publication Data

US 2008/0225726 A1    Sep. 18, 2008

(51) Int. Cl.
*H04L 12/28*  (2006.01)
*H04L 12/823*  (2013.01)
*H04L 12/26*  (2006.01)
*H04L 12/801*  (2013.01)
*H04L 29/08*  (2006.01)

(52) U.S. Cl.
CPC ......... *H04L 43/0852* (2013.01); *H04L 67/1029* (2013.01); *H04L 47/323* (2013.01); *H04L 67/1002* (2013.01); *H04L 67/1023* (2013.01); *H04L 47/193* (2013.01); *H04L 67/1008* (2013.01); *H04L 43/16* (2013.01); *H04L 67/1019* (2013.01); *H04L 67/1012* (2013.01)
USPC ........................................ 370/400; 710/316

(58) Field of Classification Search
CPC .................................................... G06F 9/5077
USPC .......... 370/400; 718/105, 102; 709/223, 224, 709/225, 200; 705/37; 714/39
See application file for complete search history.

(56) References Cited

U.S. PATENT DOCUMENTS

| | | | |
|---|---|---|---|
| 7,464,147 B1 * | 12/2008 | Fakhouri et al. | 709/223 |
| 2004/0205414 A1 * | 10/2004 | Roselli et al. | 714/39 |
| 2005/0022202 A1 * | 1/2005 | Sannapa Reddy et al. | 718/105 |
| 2005/0027862 A1 * | 2/2005 | Nguyen et al. | 709/225 |
| 2005/0160133 A1 * | 7/2005 | Greenlee et al. | 709/200 |
| 2006/0010449 A1 * | 1/2006 | Flower et al. | 718/102 |
| 2006/0155633 A1 * | 7/2006 | Fellenstein et al. | 705/37 |
| 2006/0224725 A1 * | 10/2006 | Bali et al. | 709/224 |
| 2008/0258880 A1 * | 10/2008 | Smith et al. | 340/286.02 |
| 2009/0157870 A1 * | 6/2009 | Nakadai | 709/224 |

* cited by examiner

*Primary Examiner* — Dang Ton
*Assistant Examiner* — Lionel Preval
(74) *Attorney, Agent, or Firm* — Marger Johnson & McCollom PC

(57) ABSTRACT

A system and method for selfish child clustering are disclosed. In one embodiment, the system comprises a selfish node; and a plurality of servicing nodes each connected to the selfish node, wherein the selfish node selects a first one of the servicing nodes to service requests therefrom; and wherein the selfish node evaluates a responsiveness of the first one of the servicing nodes and, responsive to a determination that the responsiveness of the first one of the servicing nodes is unacceptable, the selfish node selects a second one of the servicing nodes to service requests therefrom.

21 Claims, 3 Drawing Sheets

SYSTEM AND METHOD FOR SELFISH CHILD CLUSTERING

BACKGROUND

A distributed computing system is a group of processing units, frequently referred to as "nodes", that work together to present a unified system to a user. These systems can range from relatively small and simple, such as multi-component single systems, to world-wide and complex, such as some grid computing systems. These systems are usually deployed to improve the speed and/or availability of computing services over that provided by a single processing unit alone. Alternatively, distributed computing systems can be used to achieve desired levels of speed and availability within cost constraints.

Distributed systems can be generally described in terms of how they are designed to take advantage of various computing concepts, including specialization, redundancy, isolation, and parallelism. Different types of systems are distinguished by the tradeoffs made in emphasizing one or more of these attributes and by the ways in which the system deals with the difficulties imposed by distributed computing, such as latency, network faults, and cooperation overhead.

Most distributed systems have multiple comparable processing units available for work. If there is a problem with any particular processing unit, other units can be brought in to handle the requests which would have gone to the problem unit. For example, some services are deployed on "clusters," or interconnected groups of computers, so that the service can continue even if some of the individual computers go down. The resulting reliability is generally referred to as "high availability" and a distributed system designed to achieve this goal is a high availability system.

Part of the reason distributed systems use redundancy to achieve high availability is because each processing unit can be isolated from the larger system. Intrusions, errors, and security faults can be physically and logically separated from the rest of the system, limiting damage and promoting the continuing availability of the system. Further, distributed systems can be designed so that errors in one node can be prevented from spreading to other nodes. The ability to deal with errors is generally referred to as "fault tolerance."

One difficulty with fault tolerance is that the cost and complexity of the system grows faster than the gains in reliability from fault-tolerant systems. Thus, systems are generally engineered to be fault tolerant only within certain limits. One consequence is that fault-tolerant, high-availability systems frequently degrade gracefully under moderate pressure, but severe pressure can cause abrupt instability and experience cascading failures, even across isolation boundaries.

SUMMARY

A system and method for selfish child clustering are disclosed. In one embodiment, the system comprises a selfish node; and a plurality of servicing nodes each connected to the selfish node, wherein the selfish node selects a first one of the servicing nodes to service requests therefrom; and wherein the selfish node evaluates a responsiveness of the first one of the servicing nodes and, responsive to a determination that the responsiveness of the first one of the servicing nodes is unacceptable, the selfish node selects a second one of the servicing nodes to service requests therefrom.

DETAILED DESCRIPTION

One embodiment includes a system and method for selfish child clustering in a distributed system. To better illustrate the advantages and features of the embodiments, a particular description of several embodiments will be provided with reference to the attached drawings. These drawings, and other embodiments described herein, only illustrate selected aspects of the embodiments and do not limit the scope thereof.

For the sake of simplicity, the various embodiments will be described using common terms, where applicable. However, the use of common terms does not imply common implementations between embodiments. For example, one embodiment will use the term "node" to refer to a single computer within a distributed system. However, "node" is meant to encompass subclusters in a cluster-of-clusters system, virtualized operating systems or compute nodes, specific integrated circuits or chips, software modules, and generally any system capable of computation and communication. Similarly, the term "cluster" will be used in some embodiments to refer to a group of nodes providing a high-availability network service. However, "cluster" is meant to encompass distributed systems generally, including but not limited to NUMA systems, grid computing systems, "Beowulf" clusters, failover systems, MPP systems, and other distributed computing architectures.

Further, despite reference to specific features illustrated in the example embodiments, it will nevertheless be understood that these features are not essential to all embodiments and no limitation of the scope thereof is thereby intended. Posssible alterations, modifications, and applications of the principles described herein, such as would occur to one skilled in the art, have been omitted for clarity and brevity; nevertheless, it is understood that such alterations, modifications, and applications are contemplated. Furthermore, some items are shown in a simplified form, and inherently include components that are well known in the art. Further still, some items are illustrated as being in direct connection for the sake of simplicity. Despite the apparent direct connection, it is understood that such illustration does not preclude the existence of intermediate components not otherwise illustrated.

Figure 1:
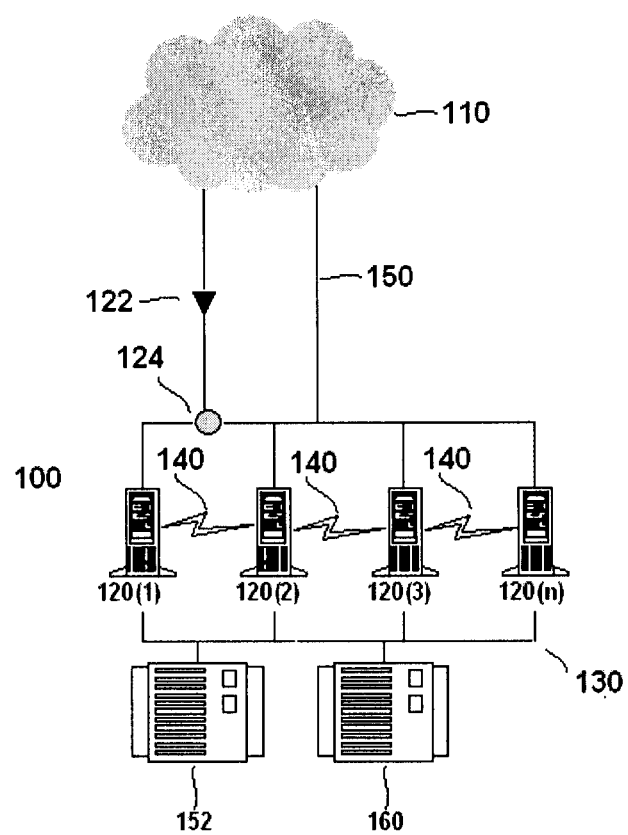
FIG. 1 illustrates a cluster server system in accordance with one embodiment.

FIG. 1 illustrates a diagram of a cluster server system 100 in accordance with one embodiment. Requests come in from sites in a network cloud 110 to the cluster system 100. Although the cluster system 100 appears to requesters as a single virtual server, the system actually comprises multiple nodes 120(1)-120(n).

Clients in the cloud 110 send requests 122 to one or more virtual IP (VIP) addresses 124. In one embodiment, the VIP addresses 124 exist as additional IP addresses to the node's regular host IP address; e.g., a node can be accessed by its VIP address(es) as well as by its regular host address. In a second embodiment the VIP is provided using NAT or a NAT-like system.

The provision of VIP addresses is implementation-dependent: in one embodiment, all services provided by the cluster are associated with the same VIP and port. A second embodiment associates only one VIP address with each network service, but a separate port. A third embodiment uses a separate VIP for each service.

Different virtual servers can be configured for different sets of physical services, such as TCP and UDP services in general. Protocol- or application-specific virtual servers that may be supported include HTTP, FTP, SSL, SSL BRIDGE, SSL TCP, NNTP, SIP, and DNS.

Within the cluster, the nodes 120(1)-120(n) have multiple interconnections. Each node 120(1)-120(n) is able to receive incoming requests 122. There are also request distribution channels 130 and one or more heartbeat channels 140 between the nodes 120(1)-120(n). One embodiment also includes a backup coordination method, such as a shared quorum partition, to provide communication and coordination services between the nodes. The nodes 120(1)-120(n) also have an outgoing connection 150 to the network cloud 110.

The nodes 120(1)-120(n) are part of a multi-tier cluster system. In such an embodiment, the nodes 120(1)-120(n) are connected to another cluster system 152 providing other services. Either the nodes 120(1)-120(n) or the second-tier cluster system 152 may additionally be connected to one or more cluster storage systems 160. The cluster systems 152 and 160 may use an embodiment of the clustering system described herein or another clustering system. Further clustering tiers are also contemplated.

For example, one embodiment uses the nodes 120(1)-120(n) as web servers. Static content for the web servers is available from a first cluster system accessible to the nodes 120(1)-120(n). Active content for the web servers is provided by a relational database running on a second cluster system accessible to the nodes 120(1)-120(n). The second cluster system may be backed by a third cluster system accessible to the second cluster system.

Within this framework, the selfish clustering method described in more detail below can be used at one or more levels. In one embodiment, selfish clustering is used only within a certain cluster. For example, one inode in a cluster is designated as a "primary," and the rest are secondary nodes. The connections to the cluster are allocated using the selfish clustering method. In a second embodiment, connections between clusters are allocated using the selfish clustering method. In general, any level of a multi-tier clustered system can be organized using the selfish child method.

Figure 2:
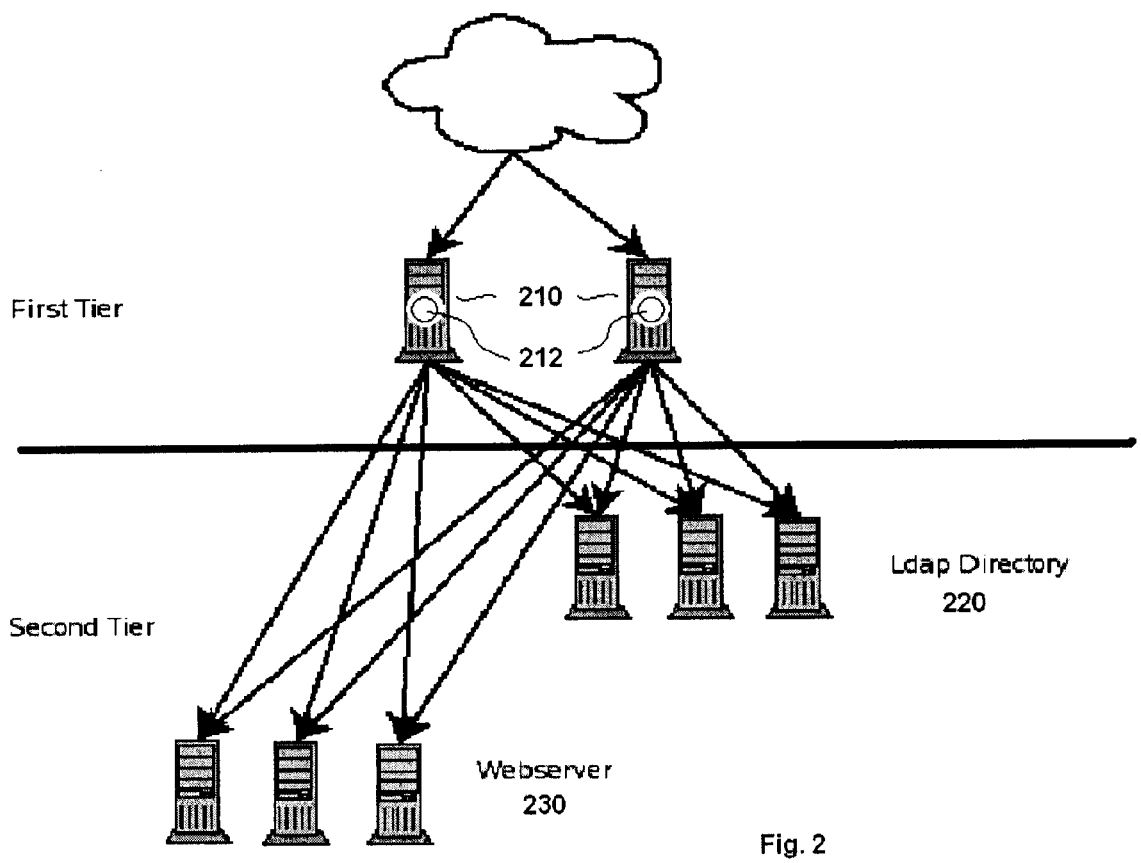
FIG. 2 is illustrates a two-tiered cluster server system with selfish nodes in accordance with one embodiment.

FIG. 2 shows one specific embodiment of a system using selfish child clustering. As discussed in reference to FIG. 1, it is appreciated that the selfish clustering method is applicable at many levels; the specificity of FIG. 2 is for clarity of description only and is not limiting.

Further, in describing certain aspects of this and other embodiments, certain functions are described as occurring within "modules." Computing modules may be general-purpose, or they may have dedicated functions such as memory management, program flow, instruction processing, object storage, etc. These modules can be implemented in any way known in the art. For example, in one embodiment a module is implemented in a hardware circuit comprising custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In another embodiment, one or more of the modules are implemented in software for execution by various types of processors. An identified module of executable code may, for instance, comprise one or more physical or logical blocks of computer instructions that may, for instance, be organized as an object, procedure, or function. Further, the executables of an identified module need not be physically located together, but may comprise disparate instructions stored in different locations that, when joined logically together, comprise the module and achieve the stated purpose for the module. A "module" of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Another embodiment uses higher-level components as modules. For example, a module may comprise an entire computer, or group of computers, acting together. A module may also comprise an off-the-shelf or custom program, such as a database management system. These higher-level modules may be decomposable into smaller hardware or software modules corresponding to different parts of a software program and identifiable chips (such as memory chips, ASICs, or a CPU) within a computer.

FIG. 2 depicts a two-tiered server cluster 200 in accordance with one embodiment. A first tier 210 is behind an L4 switch, but each node in the first tier is aware of the nodes in second tiers 220 and 230 and has connections to them. Each node in the first tier 210 contains a selfish child module 212. Nodes using a selfish child module are referred to as "selfish nodes." In one embodiment, all the nodes in the second tier 220 are of the same type, such as all LDAP servers or all web servers. Other embodiments can combine nodes of different types, such as the LDAP servers in the second tier labeled 220 or the web servers in the second tier cluster labeled 230.

Figure 3:
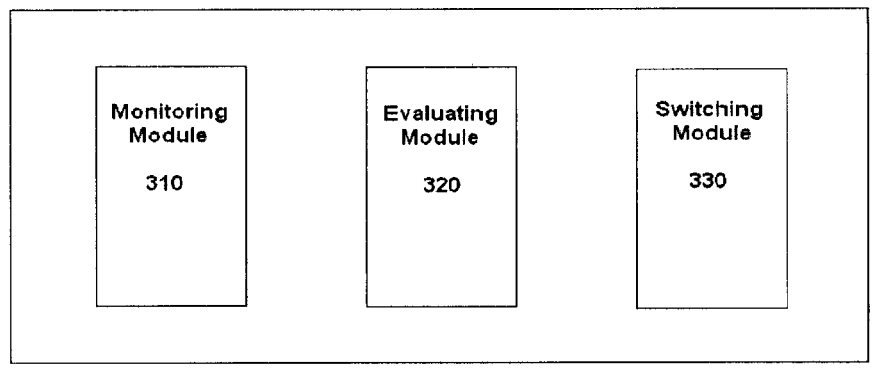
FIG. 3 illustrates a selfish child module in accordance with one embodiment.

FIG. 3 depicts an embodiment of the selfish child module 212 of FIG. 2. As shown in FIG. 3, the selfish child module 212 includes a monitoring module 310, an evaluating module 320, and a switching module 330. The selfish child module 212 also has a connection to a selected servicing node in the second tier 220. The monitoring module 310 measures the responses of individual nodes in the second tier. In one embodiment, this is accomplished by the exchange of heartbeat messages over a dedicated channel. In a second embodiment, this is accomplished by measuring an average response time over a moving window of a second-tier node. In a third embodiment, node status from a quorum partition is monitored. In some embodiments, only the selected servicing node is monitored. In other embodiments, other servicing nodes are occasionally polled as well.

The evaluating module 320 takes the information gathered by the monitoring module 310 and determines whether it is "satisfied" with the performance of the selected servicing node. In one embodiment, this is accomplished by using the information from the monitoring module 310 as predicates for a rules engine. A second embodiment compares the monitored information to preprogrammed cutoff points. A third embodiment evaluates the selfish node's own performance to see if the performance of the selected servicing node is sufficient to serve the selfish node. The selfish node is unsatisfied if it encounters higher load or connection delays because of difficulty getting the servicing node to respond. A fourth embodiment uses a time-varying threshold to adapt the minimum satisfaction level to current utilization. An absolute cap on the threshold is used to keep total satisfaction at a minimum level.

In a normally-loaded circumstance, the response from the selected servicing node in the second tier will fall within normal operating parameters, and will therefore satisfy the selfish node. If the selfish node becomes unsatisfied, however, the switching module 330 selects another servicing node with which to associate. In one embodiment, this is accomplished using a second connection. Periodic requests are sent on a test basis to prospective servicing nodes. If one prospective servicing node responds more quickly than the others, the switching module selects the prospective servicing node as the primary selected servicing node. In a second embodiment, the switching node selects a new servicing node randomly. If the new servicing node is not satisfactory, the selfish node remains unsatisfied and switches again. In a third embodiment, node or cluster information, such as servicing node loads, geographic locations, or servicing node resources are used to select a new servicing node. A fourth embodiment uses multiple connections from the selfish node to multiple servicing nodes. The switching node does not choose between which individual connection makes the selfish node the most satisfied, but rather which mix of connections makes the selfish node most satisfied overall. Further, some embodiments smooth switching behavior over time, for example, by placing restrictions on how often a selfish node can switch connections. A fifth embodiment uses genetic algorithms to maximize satisfaction. For example, random switches are used to simulate mutation; the expiration of a churn timer designates each round. Another example in a multi-servicing node embodiment uses sexual reproduction and mutation of the satisfaction-maximizing mix of servicing nodes; switching occurs after each round.

It is appreciated that placing a selfish child module on each node allows performance optimization in small pieces. Rather than a centralized database of information, the "selfish" behavior of each node allows a beneficial distribution of connections to a cluster without external coordination. It is further appreciated that selfish clustering allows for rapid and flexible load balancing in the face of unexpected events. For example, if a servicing node starts a long-running garbage collection, backup, or indexing procedure, the load will be shifted away from that servicing node to exactly the necessary proportion to keep the selfish nodes satisfied.

Another embodiment of the selfish child module allows the selfish node to throw a "tantrum." Specifically, if the selfish node has not been satisfied for a long enough time, as defined by a user-adjustable timeout, or if there is not a servicing node available that car keep the selfish node satisfied, the selfish node is allowed to suspend operations and voluntarily refuse connections.

In some embodiments, sparking a tantrum on a selfish node can prevent cascading failures. For example, assume that a servicing node experiences a hardware failure in a cluster which is running at peak capacity. Because each node is already at capacity, failover of the connections from the failed servicing node overloads the remaining servicing nodes in the cluster. Further, the percentage of connections that each servicing node will now have to handle increases from 1/(total servicing nodes) to 1/(total servicing nodes−1). This situation frequently leads to a cascading failure, where each servicing node failure further overloads the remaining servicing nodes, causing them to fail.

In some embodiment that allows selfish nodes to tantrum, assume that the selfish node is unable to find a satisfactory servicing node because all servicing nodes are in overload. Instead of continuing to hit those nodes with requests, the selfish node blocks new requests and returns an error. Without the crush of incoming requests, the second tier nodes are able to recover more quickly and are not driven into a failure state. Further, the returned error informs remote users of the temporary problem in a quick and efficient manner. The system recovers when the performance has returned and the selfish node is again able to be satisfied by the second tier nodes.

Figure 4:
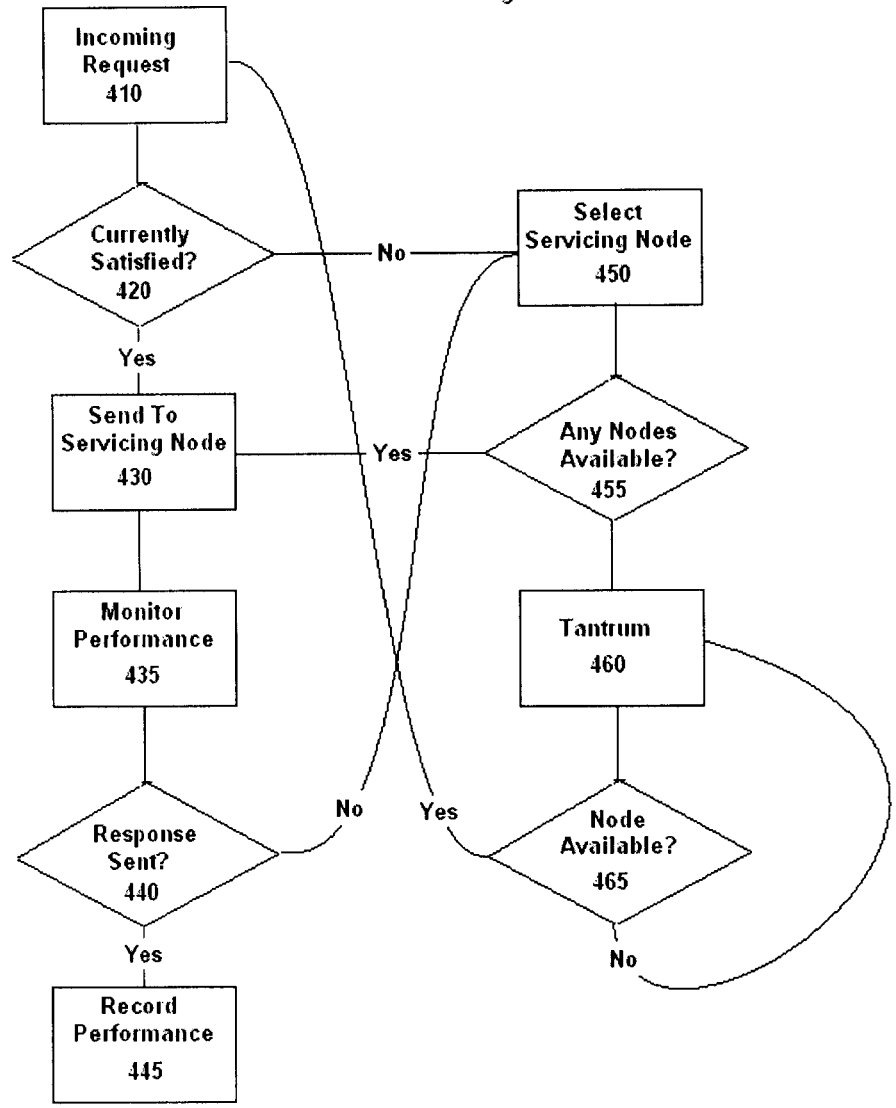
FIG. 4 is a selfish response flowchart in accordance with one embodiment.

FIG. 4 depicts a flowchart of operation of one embodiment of selfish clustering with tantrums. At step 410, a request comes into the selfish child node. At step 420, the request is passed to the evaluating module. As described above, the evaluating module decides if it is satisfied with the performance of the currently selected servicing node.

If the evaluating module is currently satisfied, processing proceeds to step 430, in which the switching module sends the request to the servicing node. At 435, the monitoring module keeps track of the responsiveness of the servicing node. If the servicing node responds within an acceptable time, processing moves to step 440 and the response is sent back. At 445, the servicing node's performance is recorded by the monitoring module and the updated performance information is made available to the evaluating module. If the servicing node does not respond within an acceptable time, the monitoring module raises an exception that is caught by the evaluating module. The evaluating module then determines that it is unsatisfied and processing moves to step 450.

In step 450, the switching module decides which servicing node should be selected as described above. If not all servicing nodes have been tried, a new servicing node is selected at 455 and processing returns to step 430. If all, or a significant portion of the available servicing nodes have been tried, execution proceeds to step 460.

Step 460 is the tantrum state, in which new requests are blocked. In one embodiment in which the selfish node is a web server, the selfish node returns an HTTP 500 busy error. A second embodiment returns a simple static page explaining the problem. A third embodiment examines the source of the slowdown. If it can be determined that a merely temporary slowdown would suffice, the selfish cluster slows down the rate at which the TCP ACKs are sent back to clients, but tries to keep the connections open for long enough to recover and successfully answer each request. Periodically, the switching module goes to step 465 and tests the available servicing nodes. If it appears that one or more servicing nodes are available to satisfy requests, the selfish node moves out of the tantrum state and back to step 410.

It is understood that several modifications, changes and substitutions are intended in the foregoing disclosure and in some instances some features of the embodiments will be employed without a corresponding use of other features. Accordingly, it is appropriate that the appended claims be construed broadly and in a manner consistent with the scope of the embodiments described herein.

What is claimed is:

1. A selfish clustering system comprising:
a selfish node; and
a plurality of servicing nodes each connected to the selfish node, wherein the selfish node selects a first one of the servicing nodes to service requests from the selfish node and sends all the requests to the first one of the servicing nodes;
wherein the selfish node evaluates a responsiveness of the first one of the servicing nodes in processing the requests and, responsive to a determination that the responsiveness of the first one of the servicing nodes is unsatisfactory, the selfish node selects a second one of the servicing nodes to service the requests therefrom;

wherein the determination that the responsiveness of the first one of the servicing nodes is unsatisfactory is made without reference to the responsiveness of the first one of the servicing nodes to any other node and without regard to load balancing among the servicing nodes; and wherein responsive to a determination that the responsiveness of the second one of the servicing nodes is unacceptable, the selfish node voluntarily enters a tantrum state and sends no requests to any of the servicing nodes.

2. The system of claim 1 wherein the selfish node evaluates the responsiveness of the first one of the servicing nodes by comparing a response time of the first one of the servicing nodes to a preselected threshold and wherein responsive to the response time of the first one of the servicing nodes exceeding the preselected threshold, the selfish node selects the second one of the servicing nodes to service requests therefrom.

3. The system of claim 1 wherein the first one of the servicing nodes is part of a first set of selected servicing nodes to service requests therefrom, and wherein the second one of the servicing nodes is part of a second set of selected servicing nodes to service requests therefrom, wherein the first and second sets of selected servicing nodes are not identical.

4. The system of claim 1 wherein the selfish node evaluates the responsiveness of the first one of the servicing nodes by comparing a throughput of the first one of the servicing nodes to a preselected threshold and wherein responsive to the throughput of the first one of the servicing nodes falling below the preselected threshold, the selfish node selects the second one of the servicing nodes to service requests therefrom.

5. The system of claim 1 wherein the second one of the servicing nodes is selected randomly.

6. The system of claim 1 wherein the second one of the servicing nodes is selected via a genetic algorithm.

7. The system of claim 1 wherein the second one of the servicing nodes is selected based on a responsiveness thereof compared to the remaining ones of the servicing nodes.

8. A method for implementing a clustering system, the clustering system comprising a first tier node and at least three second tier nodes configured to service requests from the first tier node, the method comprising:

selecting a first one of the second tier nodes to service requests from the first tier node;

sending all requests from the first tier node to the first second tier node;

evaluating a responsiveness of the first second tier node to the requests;

responsive to the responsiveness of the first second tier node falling below a satisfactory level, selecting a second second tier node to service the requests from the first tier node; and responsive to a determination that the responsiveness of the second second tier nodes is unsatisfactory, the first tier node voluntarily entering a tantrum state and not sending requests to any of the second tier nodes;

wherein the evaluating is performed without regard to load balancing among the second tier nodes.

9. The method of claim 8 wherein the determining that the responsiveness of the second tier nodes is unsatisfactory comprises one of testing a load average, inspecting cluster state, evaluating a heartbeat response, exceeding a timeout, and sending test requests to the second tier nodes.

10. The method of claim 8 wherein the determining that the responsiveness of the second tier nodes is unsatisfactory comprises evaluating the responsiveness of all second tier nodes.

11. The method of claim 8 wherein the determining that the responsiveness of the second tier nodes is unsatisfactory comprises evaluating the responsiveness of a majority of second tier nodes.

12. The method of claim 8 wherein entering the tantrum state comprises refraining from issuing requests to any of the second tier nodes.

13. The method of claim 8 wherein entering the tantrum state comprises one of limiting a rate of incoming requests to the first tier node and limiting a rate at which requests are issued to the second tier nodes.

14. The method of claim 8 wherein the tantrum state is entered relative to one second tier node and not entered relative to a second second tier node.

15. An apparatus for implementing a clustering system, the clustering system comprising a first tier node and at least three second tier nodes configured to service requests from the first tier node, the apparatus comprising:

means for selecting a first one of the second tier nodes to service requests from the first tier node;

means for sending all requests from the first tier node to the first second tier node;

means for evaluating a responsiveness of the first second tier node without regard to load balancing among the second tier nodes to the requests;

means responsive to the responsiveness of the first second tier node falling below a satisfactory level for selecting a second second tier nodes to service the requests from the first tier node; and means responsive to a determination that the responsiveness of the first second tier node and the second second tier node have fallen below the satisfactory level for causing the first tier node to voluntarily enter a tantrum state and refrain from issuing services requests to any of the second tier nodes;

wherein the means for evaluating the responsiveness of the first second tier node does not evaluate the responsiveness of the first second tier node relative to any other node.

16. The apparatus of claim 15 wherein the means for evaluating a responsiveness of the first second tier node comprises:

means for comparing a response time of the first second tier node to a preselected threshold; and means responsive to the response time of the first second tier node exceeding the preselected threshold for determining that the responsiveness of the first second tier node is unacceptable.

17. The apparatus of claim 15 wherein the means for evaluating a responsiveness of the first second tier node comprises:

means for comparing a throughput of the first second tier node to a preselected threshold; and means responsive to the throughput of the first second tier node falling below the preselected threshold for determining that the responsiveness of the first second tier node is unacceptable.

18. The apparatus of claim 15 wherein the means for selecting a second second tier node comprises means for randomly selecting one of the second tier nodes.

19. The apparatus of claim 18 wherein the means for selecting a second second tier node comprises:

means for evaluating a responsiveness of remaining ones of the second tier nodes; and means for selecting the one of the second tier nodes with the most acceptable responsiveness.

20. The method of claim 8 wherein:

selecting a first one of the second tier nodes to service requests from the first tier node includes sending all requests to the first one of the second tier nodes; and evaluating a responsiveness of the first second tier node includes evaluating a responsiveness of the first second tier node to the requests.

21. The apparatus of claim 15 wherein:

the means for selecting a first one of the second tier nodes to service requests from the first tier node includes means for sending all requests to the first one of the second tier nodes; and the means for evaluating a responsiveness of the first second tier node without regard to load balancing among the second tier nodes includes means for evaluating a responsiveness of the first second tier node to the requests without regard to load balancing among the second tier nodes.

\* \* \* \* \*